US012759363B2

(12) United States Patent
Payagala et al.

(10) Patent No.: US 12,759,363 B2
(45) Date of Patent: Oct. 13, 2026

(54) CONTROL SYSTEM AND METHOD FOR VEHICLE SUSPENSION

(71) Applicant: JAGUAR LAND ROVER LIMITED, Whitley (GB)

(72) Inventors: Nipun Payagala, Whitley (GB); Robert Neilson, Whitley (GB); James Robertson, Whitley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 36 days.

(21) Appl. No.: 18/863,262

(22) PCT Filed: May 5, 2023

(86) PCT No.: PCT/EP2023/061958

§ 371 (c)(1),
(2) Date: Nov. 5, 2024

(87) PCT Pub. No.: WO2023/214023

PCT Pub. Date: Nov. 9, 2023

(65) Prior Publication Data

US 2025/0313051 A1 Oct. 9, 2025

(30) Foreign Application Priority Data

May 5, 2022 (GB) ..................................... 2206568

(51) Int. Cl.
*B60G 17/016* (2006.01)
*B60G 17/0165* (2006.01)
(Continued)

(52) U.S. Cl.
CPC ..... *B60G 17/0164* (2013.01); *B60G 17/0165* (2013.01); *B60G 17/02* (2013.01);
(Continued)

(58) Field of Classification Search
CPC ...................... B60G 17/0164; B60G 17/0165; B60G 17/02; B60G 17/06; B60G 2400/106;
(Continued)

(56) References Cited

U.S. PATENT DOCUMENTS 4,856,813 A * 8/1989 Tanaka .............. B60G 17/0164 280/5.513
8,825,293 B2 9/2014 Hrovat et al.
(Continued)

FOREIGN PATENT DOCUMENTS

DE 102018208213 A1 11/2019
DE 102013114954 A1 7/2024
(Continued)

OTHER PUBLICATIONS

Kobayashi, JP 2008-238948, machine translation. (Year: 2008).*
(Continued)

*Primary Examiner* — Mark L. Greene
(74) *Attorney, Agent, or Firm* — McCoy Russell LLP

(57) ABSTRACT

A control system for a vehicle is provided, the control system comprising one or more controllers, the control system configured to identify an upcoming speed limit change, and in dependence on the identified speed limit change, requesting modification of one or more parameters of the vehicle suspension system. This prepares the vehicle suspension to reduce pitch forwards/backwards at a time when an acceleration/deceleration can be expected, while allowing more composed vehicle suspension settings to be used at other times.

19 Claims, 4 Drawing Sheets

(51) Int. Cl.
*B60G 17/02* (2006.01)
*B60G 17/06* (2006.01)

(52) U.S. Cl.
CPC ........ *B60G 17/06* (2013.01); *B60G 2400/106* (2013.01); *B60G 2400/80* (2013.01); *B60G 2500/10* (2013.01); *B60G 2500/201* (2013.01); *B60G 2500/22* (2013.01); *B60G 2800/014* (2013.01); *B60G 2800/18* (2013.01); *B60G 2800/22* (2013.01); *B60W 2555/60* (2020.02)

(58) Field of Classification Search
CPC ............ B60G 2400/80; B60G 2500/10; B60G 2500/201; B60G 2500/22; B60G 2800/18; B60G 2800/22; B60K 28/00–165; B60K 2028/003; B60K 2028/006; B60W 2555/60; G05D 1/0061; G05D 1/008; G05D 1/021; G05D 1/0214; G05D 1/0221; G05D 1/0223
See application file for complete search history.

(56) References Cited

U.S. PATENT DOCUMENTS

| | | | |
|---|---|---|---|
| 9,533,539 B2 * | 1/2017 | Eng | B60G 17/019 |
| 2022/0113153 A1 | 4/2022 | Nakagawa | |
| 2022/0332306 A1 | 10/2022 | Noma et al. | |

FOREIGN PATENT DOCUMENTS

| | | |
|---|---|---|
| JP | 2008238948 A * | 10/2008 |
| WO | 2021106873 A1 | 6/2021 |

OTHER PUBLICATIONS

Great Britain Intellectual Property Office, Combined Search and Examination Report under Sections 17 & 18(3) Issued in Application No. GB2206568.4, Nov. 2, 2022, 5 pages.
ISA European Patent Office, International Search Report and Written Opinion Issued in Application No. PCT/EP2023/061958, Sep. 25, 2023, WIPO, 13 pages.

* cited by examiner

CONTROL SYSTEM AND METHOD FOR VEHICLE SUSPENSION

CROSS REFERENCE TO RELATED APPLICATIONS

The present application is a U.S. National Phase of International Application No. PCT/EP2023/061958 entitled "CONTROL SYSTEM AND METHOD FOR VEHICLE SUSPENSION," and filed on May 5, 2023. International Application No. PCT/EP2023/061958 claims priority to Great Britain Patent Application No. 2206568.4 filed on filed on May 5, 2022. The entire contents of each of the above-listed applications are hereby incorporated by reference for all purposes.

TECHNICAL FIELD

The present disclosure relates to a control system and method for vehicle suspension. Aspects of the invention relate to a control system, a method of controlling vehicle suspension, a computer program and a vehicle. Embodiments of the present disclosure relate to control of a vehicle suspension system based on an upcoming speed limit change.

BACKGROUND

It is known to provide vehicles with adjustable suspension. The adjustable suspension may be semi active or fully active, taking into account information from vehicle systems and/or external sensors to continuously adjust the suspension settings to cater for road surfaces and terrain features as they are traversed. The suspension settings being varied may be physical parameters such as damper rate and spring stiffness. However, there is an inherent compromise in any passenger road vehicle's suspension system, between its ability to isolate the occupants of the vehicle from vibrations from the road and its ability to suppress primary body motion under acceleration and deceleration.

Global road networks are regulated by fixed speed limits in a majority of cases. The discrete changes in prescribed speed for the length of any particular road means that a driver obeying these limits will experience short-lived and predictable periods of acceleration or deceleration in order to meet upcoming changes in speed limit. When a driver initiates a relatively high level of acceleration or deceleration, this induces pitch motion of the vehicle body which is detrimental to the vehicle occupant's comfort, for example causing occupant head-toss which is undesirable from a comfort perspective.

It is an aim of the present invention to address one or more of the disadvantages associated with the prior art.

SUMMARY OF THE INVENTION

Aspects and embodiments of the invention provide a control system, a method of controlling vehicle suspension, a computer program and a vehicle, as claimed in the appended claims.

According to an aspect of the invention, there is provided a control system for a vehicle, the control system comprising one or more controllers, the control system configured to:

identify an upcoming speed limit change; and in dependence on the identified speed limit change, requesting modification of one or more parameters of the vehicle suspension system.

This prepares the vehicle suspension to reduce pitch forwards/backwards at a time when an acceleration/deceleration can be expected, while allowing more composed vehicle suspension settings to be used at other times.

Preferably, the one or more controllers collectively comprise:

at least one electronic processor having an electrical input for receiving data for identifying the upcoming speed limit change; and at least one memory device electrically coupled to the at least one electronic processor and having instructions stored therein;

and wherein the at least one electronic processor is configured to access the at least one memory device and execute the instructions thereon so as to modify the one or more parameters of the vehicle suspension system in dependence on the identified speed limit change.

The control system may be configured to determine an amount of longitudinal acceleration or deceleration required for the vehicle to satisfy the upcoming speed limit change, and request the modification of the one or more parameters of the vehicle suspension system in dependence on the determined amount of longitudinal acceleration or deceleration.

The control system may be configured to compare the determined amount of longitudinal acceleration or deceleration with a first threshold, and request the modification only if the determined amount of longitudinal acceleration or deceleration exceeds the first threshold.

In this way, suspension settings may only be adjusted to compensate for pitch forwards/backwards if "hard" braking or accelerating is likely, otherwise standard composed suspension may be used. Accordingly, in the case of an upcoming reduction in speed limit, a very composed driver may slow the vehicle sufficiently in advance of the speed limit change that the suspension is not adjusted (and thus composure is maximised), whereas a more aggressive driver leaving braking until the last moment is very likely to trigger the suspension adjustment. In effect, this means that the system is indirectly influenced by the manner in which the vehicle is being driven.

In some implementations, the modification may be requested only when a distance between the vehicle and the speed limit change is less than a predetermined value.

The vehicle suspension settings may thus only be altered for a short time window before the speed limit change. Generally, in order to maintain vehicle composure for as much of the time as possible, the suspension should only be adjusted for discrete time periods (or geographical regions) in which sudden accelerations and decelerations are likely.

The control system may be configured to request the modification in dependence on the detection of a driver-induced acceleration or deceleration demand (for example when the system detects that the driver has pressed the accelerator pedal or brake pedal), or an actual acceleration or deceleration of the vehicle, during a predetermined distance or time window in advance of the speed limit change.

The control system may be configured to compare an actual or requested vehicle acceleration or deceleration (amount) with a second threshold, and request the modification only if the actual or requested vehicle acceleration or deceleration (amount) exceeds the second threshold.

In this way, in some embodiments actual acceleration/braking is required to confirm the suspension adjustment, so that if the change is speed limit is not acted on by the driver, the suspension settings are not adjusted.

When the second threshold is exceeded, an amount by which the one or more parameters are requested to be modified may be dependent on a magnitude of the requested or actual rate of acceleration or deceleration, for example obtained from an inertial measurement unit of the vehicle which provides real-time data.

The control system may be configured to compare the actual or requested vehicle acceleration or deceleration with a third threshold, larger than the second threshold, wherein if the actual or requested vehicle acceleration or deceleration exceeds the third threshold, a greater modification of the one or more parameters is requested.

In this way, the amount of adjustment can be varied based on the magnitude of the acceleration/braking being applied.

The upcoming speed limit change may be identified from a database storing speed limits and map data, and from a current location of the vehicle.

The one or more parameters may comprise a spring rate and/or a damping rate of one or more elements of the suspension system, and the modification may comprise increasing the spring rate and/or the damping rate of the one or more elements.

The control system may be configured to revert the one or more parameters to their previous settings in response to a reduction in a rate of acceleration or deceleration to below a predetermined deactivation threshold.

As such, the modified suspension settings continue until the pitch compensation system is deactivated, which may advantageously be when the driver stops (or reduces) braking or accelerating.

According to another aspect of the present invention, there is provided a vehicle comprising a suspension system and a suspension control system according to any preceding claim.

According to another aspect of the present invention, there is provided a control method for vehicle suspension, the method comprising:

identifying an upcoming speed limit change; and in dependence on the identified speed limit change, requesting modification of one or more parameters of the vehicle suspension system.

According to another aspect of the present invention, there is provided computer software that, when executed, is arranged to perform a method according to the above.

The amount of longitudinal acceleration or deceleration required for the vehicle to satisfy the upcoming speed limit change may be determined from a current vehicle speed, the upcoming speed limit, and the distance between the vehicle and the speed limit change. However, it will be understood that the acceleration may instead be computed in a different way.

In the case of an upcoming increase in speed limit, the vehicle suspension system may be modified to at least partially counteract pitch backwards motion of the vehicle, and in the case of an upcoming decrease in speed limit, the vehicle suspension system may be modified to at least partially counteract pitch forwards motion of the vehicle. In some implementations, the modifications may be the same in both cases, and in other implementations the vehicle suspension system may be adjusted differently depending on whether the vehicle is due to slow down or speed up.

In the case that the upcoming speed limit is higher than a current speed of the vehicle and/or a current speed limit, the modification can preferably be requested only while the vehicle is within a first distance or time window prior to the speed limit change and/or while the vehicle is within a second distance or time window after the speed limit change. This means that, in the case of an increase in speed limit, a short window may remain after the speed limit change during which the modification might be triggered by the driver accelerating. The second distance or time window may be smaller than the first distance or time window.

In the case that the upcoming speed limit is lower than a current speed of the vehicle and/or a current speed limit, the modification can be requested only while the vehicle is within a first distance or time window prior to the speed limit change, and not after the speed limit change. In contrast, if the speed limit is reduced, no window is available afterwards.

The control system may be configured to revert the one or more parameters to their previous settings in response to the vehicle reaching the geographical location of the speed limit change, or moving at least a predetermined distance or time beyond the geographical location of the speed limit change.

The control system may be configured to revert the one or more parameters to their previous settings in response to the vehicle reaching or approaching the speed limit.

The one or more controllers may comprise a first controller for generating a suspension modification request to modify the one or more parameters of the vehicle suspension system in dependence on the upcoming speed limit change, and a second controller for receiving the suspension modification request and responsive to the suspension modification request to modify the one or more parameters of the vehicle suspension system. The second controller may be configured to generate a control output to control the one or more parameters of the vehicle suspension system, in dependence on one or more driver and/or road inputs and the request.

The control output may comprise a control current applied to the dampers and/or springs of the suspension system.

The control system may be configured to calculate a theoretical pitch change to the vehicle in dependence on the determined amount of acceleration or deceleration required to satisfy the speed limit change, the control system being configured to request said modification to oppose the theoretical pitch change. In this case, a variable adjustment of the one or more suspension parameters may be provided, with the degree of adjustment being proportional to the expected pitch change.

It will be appreciated that small accelerations or decelerations may not require any adjustment of the suspension system, since the amount of pitch forwards or backwards is likely to be small. More than one threshold may be used when determining an amount of suspension modification to apply. For example, exceeding a first, lower, threshold may result in a first modification of the suspension parameters, to oppose a relatively small amount of pitch forwards or backwards, whereas exceeding a second, higher threshold may result in a second modification of the suspension parameters. In particular, the second modification may involve a greater level of adjustment than the first modification. It will be appreciated that a greater number of thresholds may be used, or that the amount of adjustment may be continuous as a function of the amount of acceleration of deceleration required to satisfy the speed limit change.

Generally, a pitching motion, whether backwards or forwards, may be reduced by increasing the stiffness and damping of the suspension system while the acceleration or deceleration takes place. Typically, an increase is applied to both the forward suspension assemblies and the rear suspension assemblies, irrespective of whether the pitching is forwards or backwards. The increase may be applied equally to each of the front and rear assemblies, or in some cases the increase may be applied unequally, such that a greater increase is applied to the front suspension compared with the rear suspension, or vice versa. The specifics of this may depend on the specifics of the vehicle, including its dynamics and weight distribution.

The request may be made to an adaptive suspension system. In this case the adaptive suspension system is configured to generate a control output to adjust the one or more parameters, the control output being generated using a control algorithm which is a function of one or more driver inputs and/or one or more road inputs, the control output being influenced by the request.

The control output may be influenced by varying one or more gains of the control algorithm in response to the request. A gain is a calibratable multiplier applied to a control signal that is intended to influence the output of the suspension controller controlling the adaptive suspension system.

The one or more parameters may be adjusted via current control of adaptive damping hardware and/or adjustable spring rate air springs.

The one or more parameters may comprise a stiffness of one or more dampeners of the vehicle suspension (spring rate) and/or a volume of one or more air springs (damping rate) of the vehicle suspension.

It will be appreciated from the above that a semi-active spring and damping suspension system can reduce undesirable, short-lived and predictable pitch events caused by abrupt acceleration and/or deceleration of the vehicle in response to speed limit changes when it is able to make use of enhanced GPS data providing road speed limit changes up to a fixed distance (a horizon) ahead of the vehicle.

With knowledge of the speed limits ahead, software controlling the variation in damper rate and spring stiffness can pre-emptively prepare itself for a heightened state of body control when it predicts it will experience a pitch acceleration of significant magnitude. Once the vehicle has passed the speed limit change and there are no imminent changes in speed ahead, the suspension system can revert back to a more relaxed pitch control configuration which will not detrimentally impact ride comfort.

Continuously variable active and semi-active suspension systems already available in the market are able to vary the level of suspension resistance based upon a wide range of measured vehicle input conditions. The present technique builds on this capability with its ability to identify locations on the road ahead in which the driver is most likely to provide throttle and/or brake inputs. This pre-emptive identification of changes in vehicle input and vehicle reaction allows the suspension control system to pin-point exactly when the primary pitch body control should be enhanced and when it should be relaxed, rather than relying solely upon passive measurements of the vehicle state. This targeted use of enhanced body control allows the suspension control system to increase pitch body control when it is most needed and remove it when it is not, where it will typically degrade secondary ride quality.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
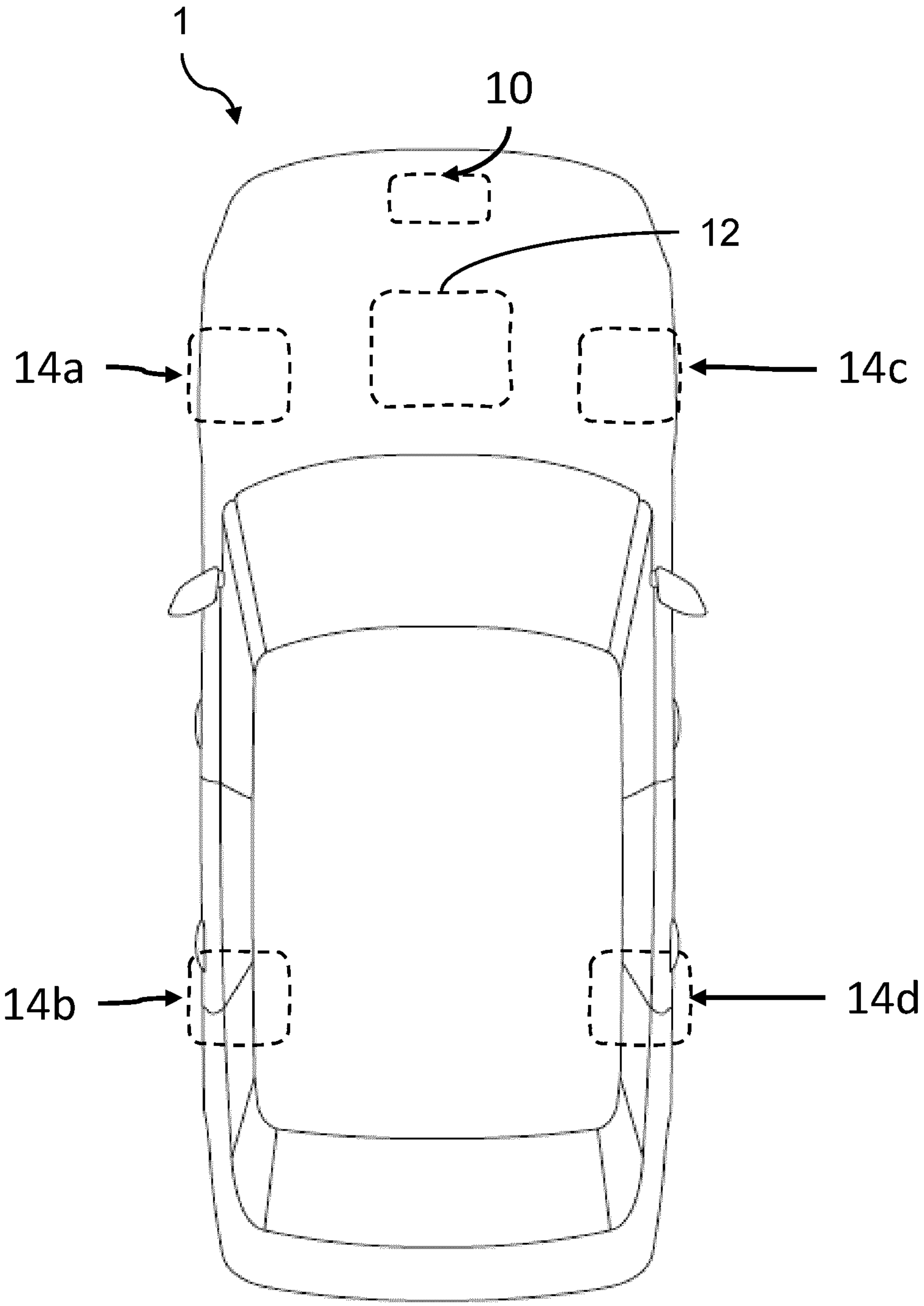
FIG. 1 shows a schematic representation of a vehicle having an adaptive suspension system and a vehicle controller.

A vehicle 1 in accordance with an embodiment of the present invention is described herein with reference to the accompanying FIG. 1. With reference to FIG. 1, the vehicle 1 comprises a control system 12 (which itself comprises one, or generally many, controllers for carrying out various vehicle functions, as will be explained below) which is connected to a transceiver 10 capable of wirelessly receiving data from an enhanced live data GPS service that provides the road curvature for the upcoming road at regular intervals ahead up to a fixed or dynamic 'horizon' distance. The enhanced GPS data includes speed limit data indicative of speed limits and their locations on a road ahead of the vehicle 1. The vehicle 1 also comprises four suspension assemblies (springs and dampers) 14*a*, 14*b*, 14*c*, 14*d* each providing a respective wheel of the vehicle 1 with a suspension capability. The four suspension assemblies 14*a*, 14*b*, 14*c*, 14*d* are controlled by the control system 12, generally by adjusting a damping current and/or air spring volume of the dampers and springs to increase or decrease an amount of damping, and increase or decrease the stiffness of the springs. By adjusting these parameters of the suspension assemblies—individually or as a group—it is possible to both generally influence the handling and refinement of the vehicle 1, and also dynamically adapt the suspension system to cope with road surface features such as bumps to improve refinement for the occupants of the vehicle 1.

Figure 2:
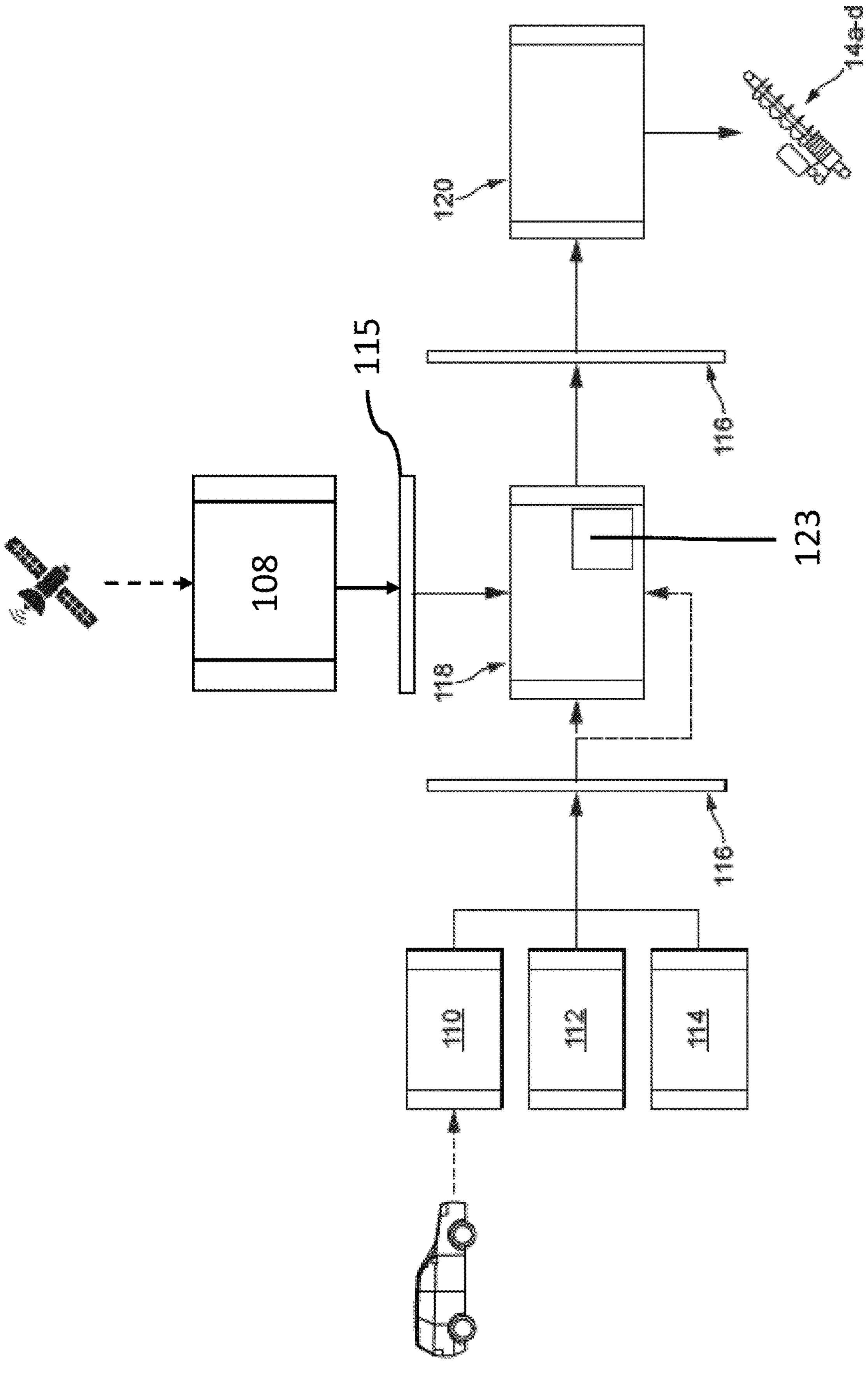
FIG. 2 shows a control system for implementing the present technique.

An example control system (such as the vehicle controller 12 of FIG. 1) in accordance with an embodiment of the present invention is described herein with reference to the accompanying FIG. 2. Generally, vehicle controller systems are of a modular nature, both structurally and functionally. Here, the control system 12 comprises an anti-lock braking system (ABS) 110, a gateway module (GWM) 112 and a car configuration file (CCF) 114. These systems are able to output data or parameters which are used in the present technique. These systems are connected via a network 116 to a driver assistance domain controller (DADC) 118. The DADC 118 is connected via the network 116 to a suspension control function 120 hosted on an Integrated Suspension Control System (ISCS). The suspension control function 120 provides active suspension control for the vehicle 1 by continuously adjusting control parameters of the suspension assemblies 14*a*, 14*b*, 14*c*, 14*d*. In particular, control currents for the dampers and the air spring volumes of the suspension assemblies 14*a*, 14*b*, 14*c*, 14*d* are individually and dynamically controlled by the suspension control function 120. That is, the various controllable parameters of the suspension system comprise a spring rate and/or a damping rate of one or more elements of the suspension system (such as a damper or an air spring), and the modification implemented in response to an actual or predicted acceleration or deceleration (based on an upcoming speed limit change) comprises increasing the spring rate and/or the damping rate of the one or more elements. Increasing the spring rate will have the effect of making the suspension stiffer, while increasing the damping rate will have the effect of increased dampening of vibration/oscillation of the suspension system. The control system 12 further comprises an infotainment system 108 which is connected to the DADC 118 via a network 115. The infotainment system 108 comprises may functions relating mainly to the provision of information and entertainment services to the occupants of the vehicle 1. Amongst these functions is the provision of navigation related data including the enhanced GPS data described above, including speed limits and locations of speed limit changes.

The ABS 110 outputs, onto the network 116, a vehicle overground speed. The GWM 112 outputs, onto the network 116, a current terrain mode for the vehicle 1 (which may be automatically set, or manually set by the driver). This information may be used to determine whether the present technique can be used, since it may not be applied when the vehicle is operating in certain terrain modes. The CCF 114 outputs, onto the network 120, one or more CCF values. The CCF 114 comprises a list of configurable parameters hosted on the Gateway Module (GWM) 112, and communicates to all of the other ECUs (controllers) on the vehicle 1 which features should be present. That is, the CCF 114 is a list of switches to tell the vehicle 1 (or more specifically its controllers) which features should be active.

The DADC 118 provides a pre-emptive suspension function. The DADC 118 is able to make suspension modification requests to the suspension control function 120 in dependence on upcoming speed limit changes, as will be described subsequently. The changes in speed limit may either be positive (transition from a relatively low speed limit to a relatively high speed limit) or negative (transition from a relatively high speed limit to a relatively low speed limit). Positive speed limit changes are likely to result in a driver accelerating the vehicle 1, whereas negative speed limit changes are likely to result in a driver decelerating (braking) the vehicle. The DADC 118 will (or may) make a different type of suspension modification request dependent on whether the change of speed limit is positive or negative and/or dependent on whether the result of the driver responding to the speed limit change is an acceleration or a deceleration. In particular, the suspension modification request signal from the pre-emptive suspension feature may request adjusting the suspension settings in either the positive or negative direction, to respectively compensate for a particular direction of pitching of the vehicle. In both cases this adjustment involves increasing the stiffness and/or damping of both the front and rear suspension. However, the amount of the increase (for a given level of acceleration or deceleration, in the case of multiple magnitude thresholds) may be different for backwards pitching (resulting from acceleration) compared with forwards pitching (resulting from deceleration).

The pitch control functionality continually monitors the position of the vehicle 1 in relation to speed limit changes, computes a required amount of acceleration to achieve an upcoming speed limit (based on the current vehicle speed, the upcoming speed limit, and the distance to the speed limit), and actual vehicle acceleration or deceleration (or requested acceleration or deceleration) when the vehicle is in the vicinity of the speed limit changes. If it is determined that the computed required amount of acceleration or deceleration exceeds a threshold, and also that an actual or requested amount of acceleration or deceleration of the vehicle exceeds a calibratable threshold value in either positive or negative directions while in the vicinity of a speed limit change, the system requests a modification in driver induced pitch acceleration and velocity mitigation gain from ISCS. The threshold may be calibrated in the same manner as other suspension control parameters, to achieve the optimum balance of ride comfort and body control. This calibration is carried out during the development and tuning phase of the vehicle programme by an engineer, rather than dynamically by the vehicle. Requests made to the ISCS are processed within the feed forward element of pitch control (driver induced motion). Damper and air spring force requests are arbitrated with other local modifiers prior to conversion into damper/spring currents. That is, the suspension control system sets physical parameters for the springs and dampers of the suspension system using control currents, and sets the values of the control currents in dependence on a control algorithm having two main components. The first component receives road inputs, such as information on the road surface and bumps ahead, and influences the control current to conform the suspension system to these. The second component takes account of driver inputs, such as driver-induced acceleration, braking and turning, and adjusts the suspension system to maintain desired motion of the vehicle body. The present technique adjusts the latter part of the control algorithm, in one implementation by adjusting gains applied to the driver related inputs and/or outputs from this part of the algorithm. In other words, the present technique modifies the responsiveness (sensitivity) to driver inputs, based on the vicinity of the vehicle to the speed limit change, the predicted amount and direction of acceleration required for the vehicle to change its velocity to match the new speed limit, and an actual or driver-requested amount of vehicle acceleration. That is, with the present technique, damper and DAS current demands are modified after arbitration of feed forward force requests, and conversion to current.

Pitch damping and pitch stiffness can be scaled up from their base passive value when both adaptive dampers and switchable volume air springs are present at all 4 corners of the vehicle. The present technique is able to identify if the imminent pitch event is either a pitch forward motion due to a braking event, or a pitch rearward motion due to an acceleration event. In doing so, it is able to request changes to pitch control from the Suspension Control System in either direction independently. The Suspension Control System (ISCS) itself is able to scale the pitch damping and/or pitch stiffness within the hardware described previously by a different value in either direction. Therefore, unique pitch resistance in a forward or rearward direction is possible.

The adjustments are made downstream of the DADC controller 118, by the Suspension Control System 120 which receives the request for alteration from the DADC 118 and modifies existing gains applied in a control algorithm administered by the suspension control system 120. A separate gain adjustment can be applied in the pitch forward direction or the pitch rearward direction, allowing independent modification of gains in acceleration or braking.

It is to be understood that the or each controller within the control system 12 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller in the control system 12 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller to implement the control techniques described herein (including some or all of the functionality required for the method described herein). The set of instructions could be embedded in said one or more electronic processors of the controller; or alternatively, the set of instructions could be provided as software to be executed in the controller. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 2, each of the controllers 108, 110, 118, 120, comprises at least one electronic processor having one or more electrical input(s) for receiving one or more input signal (from one or more of the other controllers), and one or more electrical output(s) for outputting one or more output signal(s) (to one or more of the other controllers). As mentioned, the input and output signals may be communicated via the networks 115, 116. That is, in FIG. 2 the various controllers are electronically coupled together via the networks 115, 116. The or each controller may further comprises at least one memory device electrically coupled to the at least one electronic processor and having instructions stored therein. This is shown for the controller 118, which can be seen to comprise a memory 123. The at least one electronic processor 118 is configured to access the at least one memory 123 and execute the instructions thereon so as to modify the one or more parameters of the vehicle suspension system in dependence on upcoming speed limit changes.

The, or each, electronic processor may comprise any suitable electronic processor (e.g., a microprocessor, a microcontroller, an ASIC, etc.) that is configured to execute electronic instructions. The, or each, electronic memory device 123 may comprise any suitable memory device and may store a variety of data, information, threshold value(s), lookup tables or other data structures, and/or instructions therein or thereon. In an embodiment, the memory device 123 has information and instructions for software, firmware, programs, algorithms, scripts, applications, etc. stored therein or thereon that may govern all or part of the methodology described herein. The processor, or each, electronic processor may access the memory device 123 and execute and/or use that or those instructions and information to carry out or perform some or all of the functionality and methodology described herein.

The at least one memory device 123 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

An example controller 118 has been described comprising at least one electronic processor configured to execute electronic instructions stored within at least one memory device 123, which when executed causes the electronic processor(s) to carry out the method as hereinbefore described. A similar structure may be provided for each of the controllers 108, 110, and 120. However, it will be appreciated that embodiments of the present invention can be realised in any suitable form of hardware, software or a combination of hardware and software. For example, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

In both a case of an upcoming speed limit increase, and an upcoming speed limit decrease, the present technique will pre-emptively increase pitch damping to counteract the pitch event if necessary.

Figure 3A:
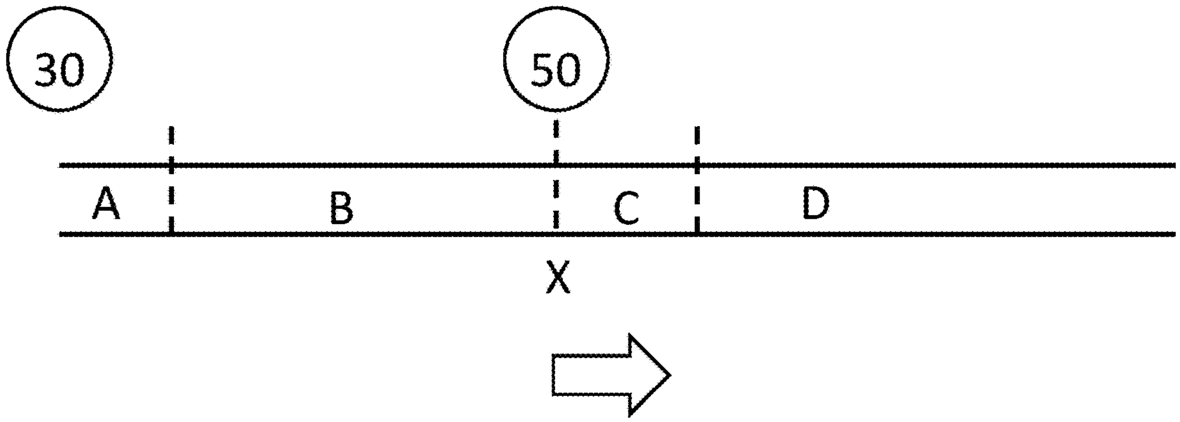
FIGS. 3A and 3B show the use of the technique to reduce pitching forwards and backwards as the vehicle approaches and passes changes in speed limit.
Figure 3B:
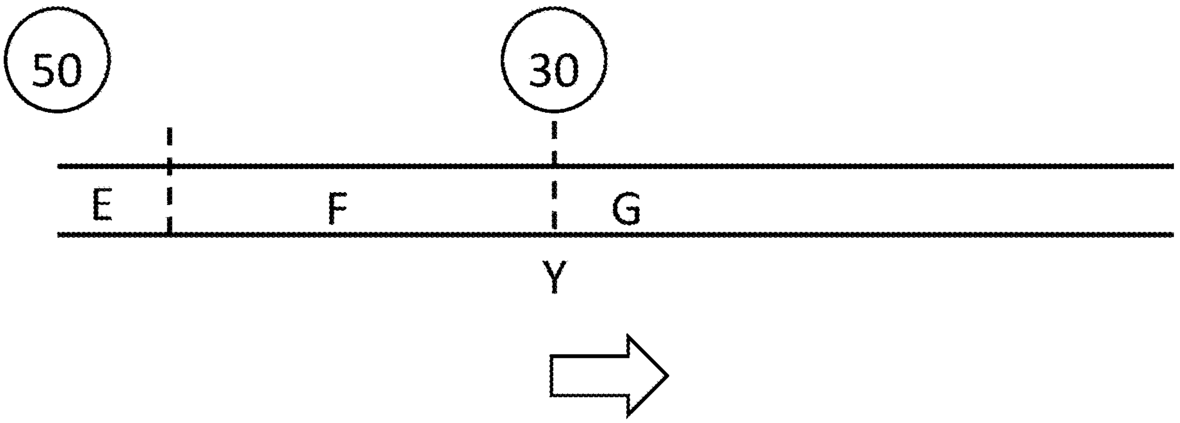

Two example scenarios are described respectively with reference to FIGS. 3A and 3B. In FIG. 3A, a road is schematically illustrated on which a vehicle 1 is travelling from left to right. The illustrated road segment includes a first portion at which a first (lower) speed limit applies, and a second portion at which a second (higher) speed limit applies. In the present case, the first (lower) speed limit is 30 km/h, and the second (higher) speed limit is 50 km/h. A change (transition) from the first to the second speed limit applies at a point X. The present technique defines a window (of distance) prior to, and after the change in speed limit, during which a driver-requested acceleration above a threshold will trigger a change in suspension settings to minimise, or at least reduce, pitch backwards motion of the vehicle. This is because, when approaching or passing a transition from a relatively low speed limit to a relatively high speed limit, it is expected that a driver may accelerate. The road in FIG. 3A is divided logically into four regions, (A), (B), (C) and (D). Region (A) is greater than a predetermined distance (or travel time) in advance of the speed limit change. During this time, the upcoming speed limit change has no influence on the suspension settings. Region (B) is in advance of the speed limit change, and less than the predetermined distance (or travel time). While the vehicle is travelling within this region, the suspension settings may be adjusted, depending on certain factors described subsequently. Region (C) is immediately after the speed limit change, by less than a second predetermined distance. Similarly to the region (B), while the vehicle is travelling within the region (C), the suspension settings may be adjusted, depending on certain factors described subsequently. Region (D) is greater than he second predetermined distance after the speed limit change. During this time, the speed limit change has no influence on the suspension settings. As a result, the adjustment to account for pitch backwards is constrained to the vicinity of the speed limit change.

Starting from the region (A), the vehicle travels towards the speed limit change at X. While travelling through the region (A) no action is taken. When the vehicle enters and travels through the region (B), the controller monitors the current speed of the vehicle, the upcoming speed limit, and the distance to the speed limit change, and calculates from these an amount of acceleration which would be required to increase the vehicle speed from its current level to the upcoming speed limit by the point X. If the calculated amount of acceleration is less than a first threshold then no action is taken in relation to adjusting the suspension settings. If the calculated amount of acceleration is greater than the first threshold, then action to adjust the suspension settings may be taken subject to the driver actually accelerating the vehicle. It will be appreciated that the calculated amount of acceleration will be relatively low towards the start of the region (B) (away from X), and will increase with proximity to X. Similarly, the calculated amount of acceleration will be relatively low if the current vehicle speed is already close to the upcoming speed limit. As a result, a driver gradually accelerating the vehicle well in advance of the speed limit change will not be likely to trigger the suspension adjustment (but will be unlikely to cause the vehicle to pitch backwards), whereas a driver waiting until close to the speed limit change to increase speed/accelerate will be likely to trigger the suspension adjustment. If the first threshold is exceeded, then the controller monitors vehicle acceleration, and compares this with a second (and preferably a third) threshold. If the acceleration remains below the first threshold, indicative of gradual acceleration, then the suspension settings will not be adjusted. However, if the acceleration exceeds the second threshold, the suspension settings will be adjusted to reduce pitch backwards of the vehicle. If a third threshold is used, then different levels of suspension adjustment may be applied. In particular, if the requested or actual acceleration is less than the second threshold, no suspension adjustment is applied. If the requested or actual acceleration is greater than the second threshold but less than the third threshold, a first (low) amount of suspension adjustment is applied. If the requested or actual acceleration is greater than the third threshold, a second (high) amount of suspension adjustment is applied.

It will be appreciated that the third threshold is greater than the second threshold. However, the first threshold may be lower or higher than the second threshold, and lower or higher than the third threshold. Generally though, the first threshold is lower than both the second and third thresholds.

When the vehicle passes the speed limit change X and enters and travels through the region (C), the controller continues to monitor the current speed of the vehicle and compare it with the new speed limit. If the current vehicle speed is less than the new speed limit (by greater than a predetermined amount), then then action to adjust the suspension settings may still be taken subject to the driver actually accelerating the vehicle. If the vehicle is already travelling at, or close to, the new speed limit, no action to adjust the suspension settings can be triggered while the vehicle is travelling through the region (C).

If the vehicle has not yet reached the new speed limit while travelling through the region (C), then the controller monitors vehicle acceleration (or an acceleration request from the driver), and compares this with the second and third thresholds as per the region (B), and similarly adjusts the suspension settings (or not) in dependence thereon.

When the vehicle reaches, and travels through, the region (D), no adjustment of the vehicle suspension in relation to the new speed limit will take place.

Within the regions (B) and (C), if suspension adjustment does take place due to the actual vehicle acceleration exceeding the second (and optionally third) thresholds, then when the vehicle acceleration drops below a deactivation threshold, the suspension adjustment ends, and the suspension settings revert to their previous settings. The deactivation threshold may be the same, or slightly less than (to avoid flip-flopping) the second threshold. Where a third threshold is used to trigger an even firmer suspension setup, then a further deactivation threshold (which may be the same, or slightly less than the third threshold) may be provided, whereby if the third threshold has been exceeded to put the suspension into an increased state of adjustment, then dropping below the second deactivation threshold will put the suspension into the lower state of adjustment associated with the second threshold. Further reduction below the first deactivation threshold will deactivate the suspension adjustment provided by the speed-limit change dependent functionality.

In FIG. 3B, a road is schematically illustrated on which a vehicle 1 is travelling from left to right. The illustrated road segment includes a first portion at which a first (higher) speed limit applies, and a second portion at which a second (lower) speed limit applies. In the present case, the first (higher) speed limit is 50 km/h, and the second (lower) speed limit is 30 km/h. A change (transition) from the first to the second speed limit applies at a point Y. The present technique defines a window (of time or distance) prior to (but not generally after) the change in speed limit, during which a driver-requested deceleration (braking) above a threshold will trigger a change in suspension settings to minimise, or at least reduce, pitch forwards motion of the vehicle. This is because, when approaching a transition from a relatively high speed limit to a relatively low speed limit, it is expected that a driver may brake. The road in FIG. 3B is divided logically into four regions, (E), (F) and (G). Region (E) is greater than a predetermined distance (or travel time) in advance of the speed limit change. During this time, the upcoming speed limit change has no influence on the suspension settings. Region (F) is in advance of the speed limit change, and less than the predetermined distance (or travel time). While the vehicle is travelling within this region, the suspension settings may be adjusted, depending on certain factors described subsequently. Region (G) is immediately after the speed limit change. While the vehicle is in this region, the speed limit change has no influence on the suspension settings, unless a change has already taken place within region (F). As a result, the adjustment to account for pitch forwards is constrained to the region before the speed limit change. In some embodiments, the suspension settings may be adjusted during a short period after the speed limit change.

Starting from the region (E), the vehicle travels towards the speed limit change at Y. While travelling through the region (E) no action is taken. When the vehicle enters and travels through the region (F), the controller monitors the current speed of the vehicle, the upcoming speed limit, and the distance to the speed limit change, and calculates from these an amount of deceleration which would be required to reduce the vehicle speed from its current level to the upcoming speed limit by the point Y. If the calculated amount of deceleration is less than a first threshold then no action is taken in relation to adjusting the suspension settings. If the calculated amount of deceleration is greater than the first threshold, then action to adjust the suspension settings may be taken subject to the driver actually decelerating/braking the vehicle. It will be appreciated that the calculated amount of deceleration will be relatively low towards the start of the region (F) (away from Y), and will increase with proximity to Y. Similarly, the calculated amount of required deceleration will be relatively low if the current vehicle speed is already close to the upcoming speed limit. As a result, a driver gradually decelerating the vehicle well in advance of the speed limit change will not be likely to trigger the suspension adjustment (but will be unlikely to cause the vehicle to pitch forwards), whereas a driver waiting until close to the speed limit change to decrease speed/brake will be likely to trigger the suspension adjustment. If the first threshold is exceeded, then the controller monitors a deceleration request from the driver, and compares this with a second (and preferably a third) threshold. If the requested deceleration remains below the first threshold, indicative of gradual deceleration, then the suspension settings will not be adjusted. However, if the requested deceleration exceeds the second threshold, the suspension settings will be adjusted to reduce pitch forwards of the vehicle. If a third threshold is used, then different levels of suspension adjustment may be applied. In particular, if the requested or actual deceleration is less than the second threshold, no suspension adjustment is applied. If the requested or actual deceleration is greater than the second threshold but less than the third threshold, a first (low) amount of suspension adjustment is applied. If the requested or actual deceleration is greater than the third threshold, a second (high) amount of suspension adjustment is applied.

It will be appreciated that the third threshold is greater than the second threshold. However, the first threshold may be lower or higher than the second threshold, and lower or higher than the third threshold.

It will be further appreciated that the first, second and third thresholds used in the case of deceleration may be the same, or different, than the first, second and third thresholds used in the case of acceleration.

When the vehicle passes the speed limit change Y and enters and travels through the region (G), no adjustment of the vehicle suspension in relation to the new speed limit will take place.

Within the region (F), if suspension adjustment does take place due to the actual vehicle deceleration exceeding the second (and optionally third) thresholds, then when the vehicle deceleration drops below a deactivation threshold, the suspension adjustment ends, and the suspension settings revert to their previous settings. The deactivation threshold may be the same, or slightly less than (to avoid flip-flopping) the second threshold. Where a third threshold is used to trigger an even firmer suspension setup, then a further deactivation threshold (which may be the same, or slightly less than the third threshold) may be provided, whereby if the third threshold has been exceeded to put the suspension into an increased state of adjustment, then dropping below the second deactivation threshold will put the suspension into the lower state of adjustment associated with the second threshold. Further reduction below the first deactivation threshold will deactivate the suspension adjustment provided by the speed-limit change dependent functionality.

From the above, it will be understood that, while in the vicinity of a speed limit decrease a deceleration demand (to slow the vehicle 1) may be made by the driver of the vehicle, by way of depressing the brake pedal. In response to the deceleration demand an action is taken by the vehicle controller to either apply the (friction or regenerative) brakes of the vehicle to slow it, or to slow the vehicle down via a reduction in engine torque, application of gear change, and the application of engine braking. Since this deceleration would normally cause the vehicle 1 to pitch forward, an action may also be taken (when in an appropriate position with respect to the speed limit change, and subject to predicted and/or actual decelerations exceeding respective thresholds) to adjust the suspension settings to mitigate or eliminate the pitching forwards of the vehicle 1.

Similarly, while in the vicinity of a speed limit increase, an acceleration demand (to increase the speed of the vehicle 1) may be made by the driver of the vehicle, by way of depressing the accelerator pedal. In response to the acceleration demand an action is taken to increase engine torque to accelerate the vehicle 1. Since this acceleration would normally cause the vehicle 1 to pitch (or sit) backwards, an action may also be taken (when in an appropriate position with respect to the speed limit change, and subject to predicted and/or actual accelerations exceeding respective thresholds) to adjust the suspension settings to mitigate or eliminate the pitching backwards of the vehicle 1.

As a result of these interventions, the occupants of the vehicle 1 will experience a smoother experience with reduced pitching within the expected acceleration and deceleration areas in the vicinity of speed limit changes. Outside of these areas the suspension system will operate as normal.

Figure 4:
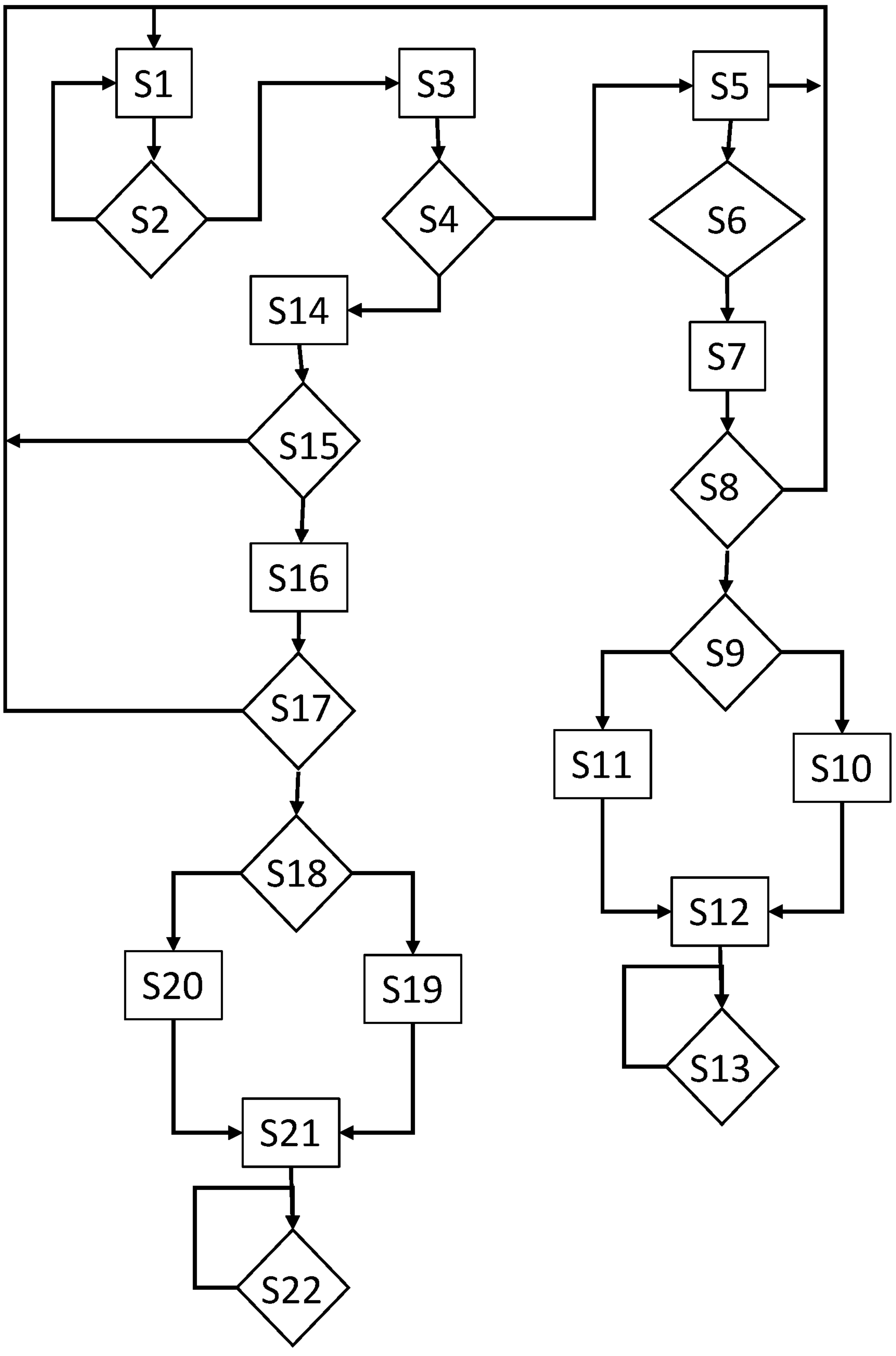
FIG. 4 shows a schematic flow diagram of the control method.

Referring to FIG. 4, an example control method according to one embodiment is illustrated by way of a flow diagram.

At a step S1, a current driving mode is determined. In particular, in some embodiments the pitch control method is only applicable in certain driving moves, such as comfort modes or economy driving modes. The pitch control method may not apply where the vehicle is in a dynamic or sports mode or when in off-road modes for example. Based on the present driving mode, it is determined at a step S2 whether the pitch adjustment functionality is available. If not, the process of FIG. 4 returns to the step S1, and is on hold until the driving mode changes at the step S1. If the pitch adjustment functionality is determined to be available at the step S2, then at a step S3 the road ahead is monitored for speed limit changes by the controller.

At a step S4, it is determined whether there is an upcoming speed limit change on the road/route ahead of the vehicle, and in particular within a predetermined distance of the vehicle. More specifically, the outcome of the step S4 may determine that (a) there is no upcoming speed limit change within the predetermined distance, or (b) that there is a speed limit increase within the predetermined distance, or (c) that there is a speed limit decrease within the predetermined distance. In the case of no upcoming speed limit change, no adjustment of the suspension settings occurs (in relation to this function, although adjustments may be made for other purposes), and the process returns to the step S3. In the case of a determined speed limit increase, then at a step S5 an amount of acceleration required to satisfy the upcoming speed limit change is calculated. At a step S6, the determined amount of acceleration is compared with a first threshold. If the determined amount of acceleration is less than the first threshold, the process returns to the step S3 and no suspension adjustment takes place at this time. If the determined amount of acceleration is greater than the first threshold, then at a step S7 an actual amount of acceleration is determined. The determined actual or requested amount of acceleration is compared with a second threshold at a step S8. If the determined actual or requested amount of acceleration is less than the second threshold, then the process returns to the step S1 and no suspension adjustment takes place at this time. If the determined actual or requested amount of acceleration is greater than the second threshold, then at a step S9 the determined actual or requested amount of acceleration is compared with a third threshold. If the determined actual or requested amount of acceleration is less than the third threshold, then at a step S10 the pitch adjustment function requests the adaptive suspension controller 124 to adjust the suspension settings by a first amount, and in particular to set the suspension settings to at least partially counteract pitching backwards of the vehicle by adjusting gains of a control algorithm to a first value (for example 10%). If the determined actual or requested amount of acceleration is greater than the third threshold then the pitch adjustment function requests, at a step S11, the adaptive suspension controller 124 to adjust the suspension settings by a second amount, and in particular to set the suspension settings to at least partially counteract pitching backwards of the vehicle by adjusting gains of a control algorithm to a first value (for example 20%). That is, if the amount of acceleration is greater, the level of adjustment of the suspension settings is accordingly influenced more strongly to compensate for the likely greater degree of backward pitching of the vehicle.

At a step S12, the adaptive suspension controller 124 adjusts the suspension settings accordingly, in response to the request. It will therefore be appreciated that the step S12 puts the vehicle suspension system into a state in which the acceleration of the vehicle will be less prone to pitching the vehicle backwards.

At a step S13, an end condition is monitored for, in order that the vehicle suspension system can revert to normal operation at the earliest suitable time. This is achieved by monitoring the actual or requested acceleration, and determining when it drops below a fourth threshold. The third threshold may be the same as the first threshold or the second threshold, or may be different. For example, the third threshold may be set lower than the first threshold in order to avoid flip-flopping. In one implementation the greater level of adjustment applied when the second threshold is exceeded may be reduced to the lower level of adjustment when demanded acceleration drops below the second threshold but remains above the first threshold, and then switched to normal settings when the demanded acceleration drops below the first threshold. When the end condition is detected and the settings returned to normal, the process reverts to the step S1.

If at the step S4 it is determined that there is a speed limit decrease ahead, then at a step S14 an amount of deceleration required to satisfy the upcoming speed limit change is calculated. At a step S15, the determined amount of deceleration is compared with a first threshold. If the determined amount of deceleration is less than the first threshold, the process returns to the step S1 and no suspension adjustment takes place at this time (in relation to this function). If the determined amount of deceleration is greater than the first threshold, then at a step S16 an actual or requested amount of deceleration is determined. The determined actual or requested amount of deceleration is compared with a second threshold at a step S17. If the determined actual or requested amount of deceleration is less than the second threshold, then the process returns to the step S1 and no suspension adjustment takes place at this time. If the determined actual or requested amount of deceleration is greater than the second threshold, then at a step S18 the determined actual or requested amount of deceleration is compared with a third threshold. If the determined actual or requested amount of deceleration is less than the third threshold, then at a step S19 the pitch adjustment function requests the adaptive suspension controller 124 to adjust the suspension settings by a first amount, and in particular to set the suspension settings to at least partially counteract pitching forwards of the vehicle by adjusting gains of a control algorithm to a first value (for example 10%). If the determined actual or requested amount of deceleration is greater than the second threshold then the pitch adjustment function requests, at a step S20, the adaptive suspension controller 124 to adjust the suspension settings by a second amount, and in particular to set the suspension settings to at least partially counteract pitching forwards of the vehicle by adjusting gains of a control algorithm to a first value (for example 20%). That is, if the amount of deceleration is greater, the level of adjustment of the suspension settings is accordingly influenced more strongly to compensate for the likely greater degree of forward pitching of the vehicle.

At a step S21, the adaptive suspension controller 124 adjusts the suspension settings accordingly, in response to the request. It will therefore be appreciated that the step S21 puts the vehicle suspension system into a state in which the deceleration of the vehicle will be less prone to pitching the vehicle forwards.

At a step S22, an end condition is monitored for, in order that the vehicle suspension system can revert to normal operation at the earliest suitable time. This is achieved by monitoring the actual or requested deceleration, and determining when it drops below a fourth threshold. The third threshold may be the same as the first threshold or the second threshold, or may be different. For example, the third threshold may be set lower than the first threshold in order to avoid flip-flopping. In one implementation the greater level of adjustment applied when the second threshold is exceeded may be reduced to the lower level of adjustment when demanded deceleration drops below the second threshold but remains above the first threshold, and then switched to normal settings when the demanded deceleration drops below the first threshold. When the end condition is detected and the settings returned to normal, the process reverts to the step S3.

As explained above, the suspension adjustments taking place in response to an acceleration may differ from those in response to a deceleration. For example, in the case of an acceleration the first amount may be 10%, and the second amount 20%, while in the case of a deceleration the first amount may be 20%, and the second amount 40%. This is merely one example, and the specific amounts used (and whether an acceleration or deceleration will give rise to greater adjustments for a given level of acceleration/deceleration) will be a matter of specific implementation and vehicle tuning.

This present technique makes use of existing hardware, software and data provision capabilities to achieve its aim, particularly an existing active suspension system and existing data on vehicle speed limits ahead of the vehicle. These two systems are conventionally not linked together, but in the present case are linked via the control methodology described above.

From the above it will be understood that an algorithm, hosted by the DADC, is connected to the vehicle's network and is able to modify the behaviour of the suspension control system, for example by adjusting pitch control severity. This algorithm continuously reads and monitors the current and upcoming speed limits ahead of the vehicle, predicts likely high levels of vehicle acceleration (or deceleration) and detects actual high levels of vehicle acceleration (or deceleration). By monitoring the severity of the predicted and actual levels of acceleration or deceleration, the algorithm is able to determine whether a change in suspension behaviour to counter-act the side effect of excessive pitch motion is warranted.

If the algorithm deems the severity to be great enough, it will request an increase in pitch control from the suspension control system in either direction of pitch: pitch forward, if a deceleration is demanded, or pitch backwards, if an acceleration is demanded. The suspension control system with a heightened state of pitch control, will increase control by means of increased damping rate and/or increased spring rate.

Once the suspension control system has received the request for increased levels of pitch control, it then has the ability to increase control, after arbitrations with other non-related inputs, via current control of adaptive damping hardware and adjustable spring rate air-springs.

The ability to adjust the suspension system to pre-emptively react to probable changes in vehicle acceleration results in an enhancement to overall driver and passenger comfort. The temporary increases in pitch control may prevent or at least reduce excessive forward/backwards head-toss motion for the driver and occupants during likely instances of high acceleration or deceleration. The targeted and temporary increases in this damping also prevent excessive damping in situations where it is not needed, preventing or reducing corruption of the vehicle's ability to isolate the cabin from road disturbances.

The system provides a state-based output which has 3 potential levels, and these are delivered to the suspension control system over the vehicle network responsible for enforcing the changes within the driver induced pitch control. These 3 levels are "no change", "small change", and "large change". If a change is enforced, it will have the effect of heightening driver induced pitch control by temporarily increasing the calibrated gain for pitch compensation.

The ability of the system to predict the acceleration required to meet an upcoming speed limit change is realised by processing upcoming speed limit information from the enhanced GPS data service in parallel with vehicle measured states (such as current vehicle speed). By continuously monitoring the next upcoming speed limit change, the distance ahead of the vehicle to the speed limit change, and the current speed of the vehicle, a prediction of the longitudinal acceleration required for the vehicle to meet the upcoming speed limit restriction at the required position can be made. If the predicted acceleration required exceeds a calibratable threshold value and the distance from the upcoming speed limit change falls within a separate calibratable threshold value, the system is triggered. Once triggered, the system then continuously monitors the absolute measured longitudinal acceleration of the vehicle. If this exceeds a first calibratable threshold value, the system switches to requesting a lower level of heightened pitch control from the suspension controller. If the measured longitudinal acceleration continues to grow in magnitude and exceeds a second calibratable threshold value, the system will request a higher level of heightened pitch control from the suspension control system.

The condition for the system to deactivate its condition of heightened pitch control may be that the measured longitudinal acceleration falls below a calibratable threshold value—for example deactivation from large adjustment to small adjustment, or small adjustment to no adjustment.

Once deactivated, the system starts over again and monitors road ahead for the next upcoming speed limit change.

It will be appreciated that various changes and modifications can be made to the present invention without departing from the scope of the present application. For example, all of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A control system for a vehicle, the control system comprising one or more controllers, the control system configured to:

identify an upcoming speed limit change;

in dependence on the identified speed limit change, request modification of one or more parameters of a vehicle suspension system; and monitor a position of the vehicle in relation to the speed limit change, determine an amount of longitudinal acceleration or deceleration required for the vehicle to satisfy the upcoming speed limit change, and request the modification of the one or more parameters of the vehicle suspension system in dependence on the determined amount of longitudinal acceleration or deceleration.

2. The control system of claim 1, wherein the one or more controllers collectively comprise:

at least one electronic processor having an electrical input for receiving data for identifying the upcoming speed limit change; and at least one memory device electrically coupled to the at least one electronic processor and having instructions stored therein;

and wherein the at least one electronic processor is configured to access the at least one memory device and execute the instructions thereon so as to modify the one or more parameters of the vehicle suspension system in dependence on the identified speed limit change.

3. The control system according to claim 1, configured to compare the determined amount of longitudinal acceleration or deceleration with a first threshold, and to request the modification only if the determined amount of longitudinal acceleration or deceleration exceeds the first threshold.

4. A control system for a vehicle, the control system comprising one or more controllers, the control system configured to:

identify an upcoming speed limit change; and in dependence on the identified speed limit change, request modification of one or more parameters of a vehicle suspension system, wherein the modification is requested only when a distance or time window between the vehicle and the speed limit change is less than a predetermined value.

5. A vehicle comprising a suspension system and the control system according to claim 4.

6. A control system for a vehicle, the control system comprising one or more controllers, the control system configured to:

identify an upcoming speed limit change;

in dependence on the identified speed limit change, request modification of one or more parameters of a vehicle suspension system; and request the modification in dependence on a detection of a driver-induced acceleration or deceleration demand, or an acceleration or deceleration of the vehicle, during a predetermined distance or time window in advance of the speed limit change.

7. The control system according to claim 6, configured to compare an actual or requested vehicle acceleration or deceleration with a second threshold, and to request the modification only if the actual or requested vehicle acceleration or deceleration exceeds the second threshold.

8. The control system according to claim 7, wherein when the second threshold is exceeded, an amount by which the one or more parameters are requested to be modified is dependent on a magnitude of the actual or requested vehicle acceleration or deceleration.

9. The control system according to claim 7, configured to compare the actual or requested vehicle acceleration or deceleration with a third threshold, larger than the second threshold, wherein if the actual or requested vehicle acceleration or deceleration exceeds the third threshold, a greater modification of the one or more parameters is requested.

10. A vehicle comprising a suspension system and the control system according to claim 6.

11. The control system according to claim 1, wherein the upcoming speed limit change is identified from a database storing speed limits and map data, and from a current location of the vehicle.

12. The control system according to claim 1, wherein the one or more parameters comprises a spring rate and/or a damping rate of one or more elements of the vehicle suspension system, and the modification comprises increasing the spring rate and/or the damping rate of the one or more elements.

13. The control system according to claim 1, wherein the control system is configured to revert the one or more parameters to their previous settings in response to a reduction in a rate of acceleration or deceleration to below a predetermined deactivation threshold.

14. A vehicle comprising a suspension system and the control system according to claim 3.

15. A control system for a vehicle, the control system comprising one or more controllers, the control system configured to:

identify an upcoming speed limit change;

in dependence on the identified speed limit change, request modification of one or more parameters of a vehicle suspension system; and monitor a position of the vehicle in relation to the upcoming speed limit change and wherein the modification is requested only when a distance or time window between the vehicle and the speed limit change is less than a predetermined value.

16. The control system of claim 15, wherein, if the upcoming speed limit change is to a speed limit higher than a current speed of the vehicle and/or a current speed limit, the modification is requested only while the vehicle is within a first distance or time window prior to the speed limit change and/or while the vehicle is within a second distance or time window after the speed limit change.

17. A control method for a vehicle suspension system of a vehicle, the control method comprising:

identifying an upcoming speed limit change;

in dependence on the identified speed limit change, requesting modification of one or more parameters of the vehicle suspension system; and monitoring a position of the vehicle in relation to the upcoming speed limit change, determining an amount of longitudinal acceleration or deceleration required for the vehicle to satisfy the upcoming speed limit change based on a current vehicle speed, the upcoming speed limit change, and a distance from the vehicle to the speed limit change, and requesting the modification of the one or more parameters of the vehicle suspension system in dependence on the determined amount of longitudinal acceleration or deceleration.

18. A control method for a vehicle suspension system of a vehicle, the control method comprising:

identifying an upcoming speed limit change;

in dependence on the identified speed limit change, requesting modification of one or more parameters of the vehicle suspension system; and monitoring a position of the vehicle in relation to the upcoming speed limit change and wherein the modification is requested only when a distance or time window between the vehicle and the speed limit change is less than a predetermined value.

19. The control method of claim 18, wherein, if the upcoming speed limit change is to a speed limit higher than a current speed of the vehicle and/or a current speed limit, the modification is requested only while the vehicle is within a first distance or time window prior to the speed limit change and/or while the vehicle is within a second distance or time window after the speed limit change.

* * * * *